Figure 3:
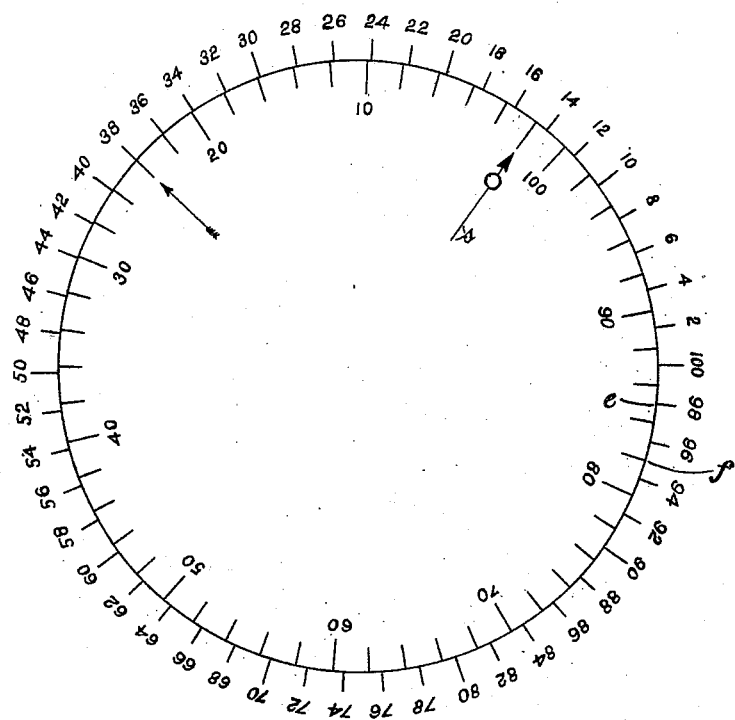

No. 855,865. PATENTED JUNE 4, 1907.
H. ROOST.
MEASURING INSTRUMENT.
APPLICATION FILED AUG. 10, 1904.
2 SHEETS—SHEET 1.
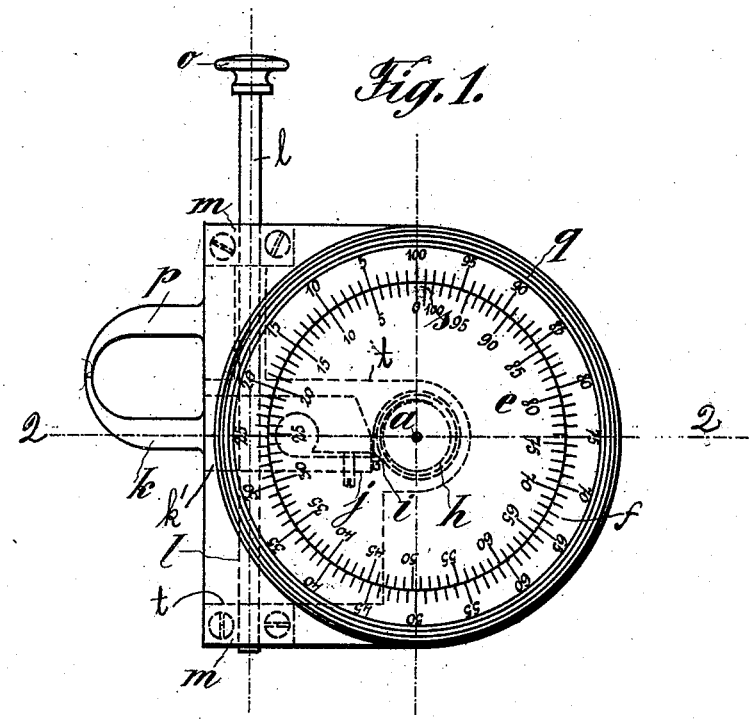
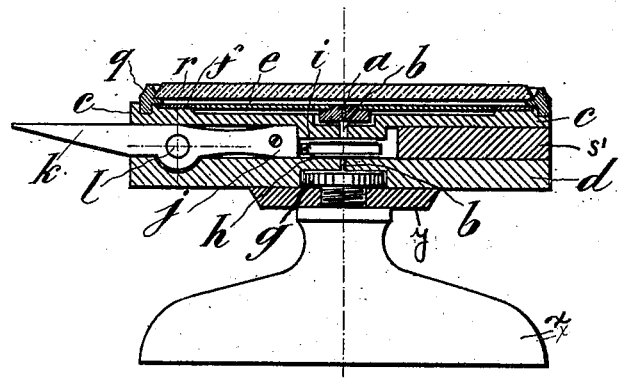
Witnesses:
N. M. Kuehne
John A. Percival
Inventor:
Hermann Roost
BY
Richards
ATTORNEYS No. 855,865. PATENTED JUNE 4, 1907.
H. ROOST.
MEASURING INSTRUMENT.
APPLICATION FILED AUG. 10, 1904.

2 SHEETS—SHEET 2.

UNITED STATES PATENT OFFICE.

HERMANN ROOST, OF LE LOCLE, SWITZERLAND.

MEASURING INSTRUMENT.

No. 855,865.  Specification of Letters Patent.  Patented June 4, 1907.

Application filed August 10, 1904. Serial No. 220,245.

*To all whom it may concern:*

Be it known that I, HERMANN ROOST, a citizen of the Republic of Switzerland, and a resident of Le Locle, Switzerland, have invented a new Measuring Instrument, of which the following is a specification.

The invention is illustrated in the accompanying drawings in which:—

Figure 1 is a plan view and—Fig. 2 is a section taken on line 2—2 of Fig. 1. Fig. 3 is a diagrammatical view.

On a base $x$ I mount a small plate $y$ on which is supported two plates $c$, $d$, separated from each other by a plate $s'$. One half of these plates is semi-circular while the other half is rectangular, the plate $s'$ having a stationary arm or touch $p$ at its front end and being cut away as shown in dotted lines $t$ in Fig. 1, so as to leave a space in which lie the parts to be described hereinafter.

A movable arm or touch $k$ having an enlarged body $k'$ which is adapted to move in the space before mentioned, is actuated by the slide $l$ having the button $o$ attached thereto, said slide being connected to the body $k'$. The slide $l$ passes through holes $m$ $m$ formed in the plate $s'$.

The plates $c$, $d$, carry sleeves $b$—$b$ through which passes a transverse shaft $a$, having one end secured to an index disk $e$, while its other end is connected with a spring $g$, similar in its principle to the barrel spring of a watch. Intermediate the ends of shaft $a$, between the plates $c$, $d$, is secured a disk $h$ which is connected through a thin steel ribbon $i$ with the end $j$ of the body $k'$ the steel ribbon $i$ being wound around the disk. Thus the spring $g$ acting through the shaft $a$, disk $h$ and connection $i$ tends to keep the arm $k$ in contact with the stationary arm $p$.

A rim $q$ fastened to the plate $c$ bears a plate glass $r$ and below this glass is mounted a dial $f$, said dial being concentric to the disk $e$, as shown in the drawing. The dial $f$ is divided into 100 equal parts, each of them representing a space of 1 millimeter between the arms $k$, $p$.

The index disk $e$ is divided in the following way: A first division $s$, serving as an index, is traced and represents the hundredth part of the circumference of $e$, this division $s$ being equal to one of the divisions of the dial $f$. The remainder of the circumference of the disk $e$ is divided into 100 equal parts.

The operation of the device is as follows:

The arm $k$ is moved away from the arm $p$ by means of the slide $l$ and the article to be measured placed between said arms. On releasing the slide $l$ spring $g$ will cause arm $k$ to move toward the arm $p$, by means of shaft $a$ and connection $i$. Thus the article will be gripped between the arms and the thickness of the same can be determined by the indication on the dial $f$ and disk $e$, which latter has been rotated by the movement of arm $k$ through the connection $i$ and shaft $a$.

The manner of using the instrument is as follows—Supposing the jaws or arms to have been separated by the slide in the manner before explained, the position of the pointer $s$ with relation to the scale of the outer dial will determine the number of millimeters the arms or jaws have separated, the pointer moving one division for each millimeter that the jaws separate. If however the pointer $s$ does not come into perfect alinement with one of the divisions of the dial $f$ the fractional reading is determined by the inner scale $e$, the fraction being indicated by that division line of the inner scale or dial that is in ailnement with a division of the outer scale or dial. Supposing for instance, the jaws to have been opened a distance sufficient to have turned the dial $e$ until the pointer $s$ has passed the seventh division mark on the outer scale marked 14 as shown in Fig. 3, an opening of fourteen millimeters and a fraction. If the twelfth line on the dial $e$ marked 24 is the one which is in alinement with one of the division marks of the outer scale then the fraction is .24, the exact distance between the arms or jaws $h$ and $k$ being 14.24 millimeters.

I claim as my invention:—

1. A measuring instrument comprising two concentric members, one member having movement in relation to the other one of said members having a plurality of equally spaced graduations around its circumference, the other member having two graduations or marks spaced apart a distance equal to the distance between the graduations of the first member, the remainder of the circumference of said second part being divided by graduations into spaces equal in number to the entire number of the first part, substantially as described.

2. A measuring instrument consisting of a frame, a stationary touch or arm secured thereto, a movable touch sliding in said frame, an axle, a connection from said axle to the movable touch, means on said axle for normally keeping the touches in contact, a disk connected with said axle, a fixed ring surrounding said disk, said ring having a plurality of equally spaced graduations around its circumference, and said disk having its circumference divided into an equal number of spaces plus one, said one being equal to one of the spaces of the ring, and means for moving the movable touch to make a measurement, substantially as described.

In witness whereof I have hereunto set my hand in presence of two witnesses.

HERMANN ROOST.

Witnesses:
 ARMAND PERRELET,
 PHILIPPE BÉGUIN.